United States Patent
Hudspeth et al.

[15] 3,688,859
[45] Sept. 5, 1972

[54] VEHICULAR AIR COMPRESSION SYSTEM

[72] Inventors: Steve A. Hudspeth; John B. Lunsford, both of Springfield, Oreg.

[73] Assignee: FMA, Inc., Eugene, Oreg.

[22] Filed: Oct. 8, 1970

[21] Appl. No.: 79,125

[52] U.S. Cl. ..............180/66 B, 280/124 R, 417/233
[51] Int. Cl. ............................................B60k 25/10
[58] Field of Search........280/124 R; 180/54 R, 66 B; 417/231, 233

[56] References Cited

UNITED STATES PATENTS 2,049,010  7/1936  Horton......................180/54

FOREIGN PATENTS OR APPLICATIONS 326,115  3/1930  Great Britain ..........180/66 B Primary Examiner—Philip Goodman
Attorney—James D. Givnan, Jr.

[57] ABSTRACT

A cylinder having a piston and piston rod assembly reciprocated by a wheel suspension member of the vehicle for the transfer of a fluid to a pressure storage tank. A fluid motor downstream from the tank is operated by a valve regulated flow of air for the controlled operation of various powered systems of the vehicle. An air flow circuit is completed back to the cylinder via a second tank constituting a source of low pressure air. The cylinder is simultaneously charged with a quantity of air on one side of the piston while air is exhausted, under pressure, on the opposite side of the piston.

3 Claims, 2 Drawing Figures

PATENTED SEP 5 1972  3,688,859
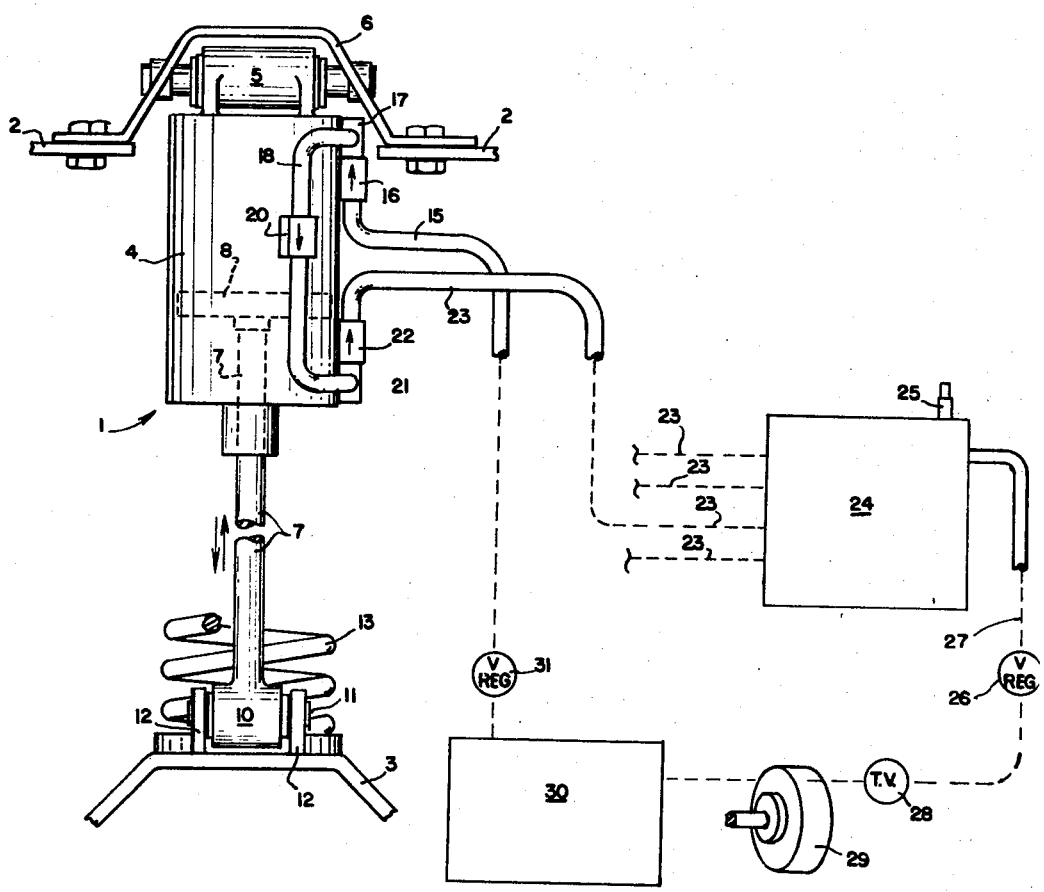
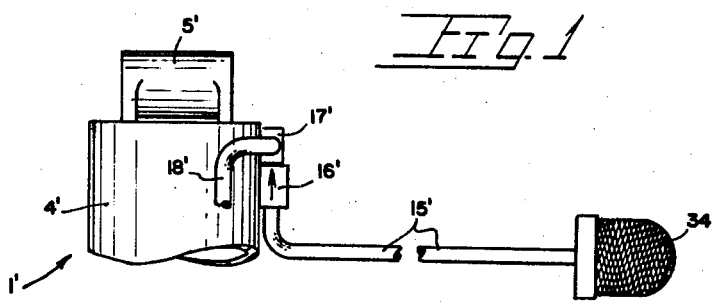
STEVE A. HUDSPETH
JOHN B. LUNSFORD
INVENTOR.
BY
*James A. Hinson*
AGENT

3,688,859

VEHICULAR AIR COMPRESSION SYSTEM

BACKGROUND OF THE INVENTION

The present invention relates to a vehicular carried air compression system and more particularly to such a system utilizing vertical travel of the vehicles wheel suspension members as a source of power for air pressurization.

In the present field of invention automotive components operated by differential air pressure are, for the most part, of the vacuum type. They are dependent on a continuous source of vacuum or negative pressure for their operation, such a source commonly being the intake manifold of an internal combustion engine. In distinction, the present invention provides for a continuous flow of pressurized air through an air motor the power of which may be utilized for various automotive purposes including powering the vehicle.

SUMMARY OF THE INVENTION

The present invention is embodied within an air compression system for installation on a vehicle wherein vertical wheel motion is utilized as a source of power. A piston responsive to wheel motion works within a cylinder carried by the vehicle frame or chassis. A wheel suspension member of the automobile in its movement toward and away from the frame while the vehicle is underway actuates the piston in a continuous manner to forcefully exhaust air from the cylinder to a pressure storage tank. The downstroke of the piston exhausting the air under pressure is in compliance with normal wheel suspension movement wherein the automobile suspension member is moved downwardly by means of a spring or like component of the automobile.

An important object of the present invention is the provision of an air cylinder having a piston in continuous motion in response to vertical motion of the automobiles suspension member during travel.

The air cylinder utilizes a sequential flow of air passing through a series of check valves which permits the cylinder to operate in the nature of an air pump. Normal travel of the vehicles suspension member and hence the "ride" of the vehicle is largely unaffected during upward movement of said member. Oppositely, downward movement of the suspension member to its normal position, as urged by a vehicle spring member, results in the air being exhausted from the lower end of the cylinder, which advantageously accomplishes dampening of wheel motion similar to that affected by a shock absorber unit.

BRIEF DESCRIPTION OF THE DRAWING

In the accompanying drawing,

FIG. 1 is a side elevational view of a wheel air cylinder shown with associated vehicle components and with the remaining system components being shown in schematic form, and FIG. 2 is a schematic showing a modification of the present system.

DESCRIPTION OF PREFERRED EMBODIMENTS

With continuing reference to the drawing wherein applied reference numerals indicate parts similarly identified in the following specification, the reference numeral 1 indicates generally an air cylinder of the present invention disposed intermediate a vehicle frame member 2 and a wheel suspension member of the vehicle respectively. Both the frame member and the wheel suspension member are shown in fragmentary form and may be considered typical of conventional vehicle construction.

The air cylinder comprises a cylinder 4 adapted at its upper end by means of a boss at 5 for reception of a pin 9, the latter in bracketed attachment at 6 to the vehicle frame 2. The pin 9 extends through boss 5 for reception within the bracket 6. Indicated at 7 is a piston rod integral with a piston 8 for permitting travel substantially the length of cylinder 4. The lower terminus of piston rod 7 is also provided with a boss 10 within which a pin 11 is received for retention by a pair of plates 12 on the wheel suspension member 3. The bracketed attachment so provided for the upper and lower ends of the air cylinder 1 permits lateral displacement of same during closing movement between suspension member 3 and the vehicle frame 2.

The wheel suspension member 3 carries the lower end of a vehicle suspension spring 13 which terminates oppositely at its upper end in supporting engagement with the vehicle frame 2 in a conventional manner. The placement of an air cylinder 1 intermediate the frame 2 and wheel suspension component 3 of a vehicle is not restricted to the manner shown and described, the present frame and suspension member disclosure is intended only as being typical of an air cylinder installation. It will be recognized that additional such air cylinders located adjacent the remaining wheels of the vehicle may be associated with other types of suspension components, e.g., leaf springs or torsion bars and requiring but workmanlike modifications of the present invention.

For operation of the air cylinder 1 a requirement exists that under normal spacing of the vehicles frame 2 and suspension component 3 the cylinders piston rod 7 will be in an extended position to locate the piston 8 in spaced relationship from the upper end of cylinder 4. Obviously a sufficient travel for piston 8 must be provided so as to permit normal flexing of spring member 13 during vertical wheel travel while the vehicle is underway.

A cylinder inlet line or supply conduit at 15 provides a source of air to the upper end of the air cylinder via a ball check valve 16. A cylinder fitting 17 receives the incoming flow of air past the check 16 (in the direction indicated) and directs same into the interior of the cylinder upon downward movement of piston 8. An air transfer conduit 18 is in communication at its upper and lower ends with like ends of cylinder 4 permitting transfer of air therebetween. A second ball check valve at 20 restricts passage of air to the downward flow indicated for entry of the air into the lower end of the cylinder via a second cylinder fitting 21. An exhaust conduit line at 23 is also in communication with cylinder 4 via a check valve 22 and the fitting 21 to direct air exhausted from the rod side of piston 8 to a pressure storage tank at 24. Additional outflow lines from other (not shown) air cylinders are indicated at 23. Such other air cylinders are similarly associated with each of the other three wheel suspension members.

Tank 24 for the storage of air pressurized by the air cylinders is fitted with a valve 25 for charging of the tank from an external source of pressurized air as for instance an automobile service station facility. If desired, tank 24 may be in the nature of an accumulator incorporating a movable diaphragm which is biased by mechanical or fluid means against the stored charge of pressurized air.

A relief valve 26 downstream from the tank in a conduit 27 limits the air pressure valve within the tank while a throttle valve 28 provides for control of the air flow through the conduit 27 and hence the volume of air delivered to an air driven motor at 29 for conversion of the air flow to useful mechanical force. Motor 29 may be one of several types commercially available, such as for example a sliding vane type motor.

In one form of the invention a low pressure tank 30 is charged by the exhaust flow from motor 28 at approximately 10 PSI (above atmospheric). A pressure regulator is indicated at 31. The tank 30 provides a source of air, under pressure, to the inlet line 15 to complete an air system circuit to the air cylinder 1.

For purposes of converting the constant pressure flow from storage vessel 24 into a pulsating air flow in conduit 27, if such is desired, the addition of the structure described and claimed in a copending patent application, filed by the present inventors and entitled Air Pulsing System may be made.

In operation upon retraction of piston rod 7 as occurs upon the moving vehicle wheel encountering a bump the air above piston 8 is restricted by check valve 16 to transfer via conduit 18 to the rod side of piston 8. With the cylinder area below the piston 8 enlarging as the piston rises, the air moving through conduit 18 will be drawn into said area in view of tank pressure in exhaust line 23. At the limit of upward piston movement the suspension spring 13 will be compressed with subsequent extension of the vehicles spring 13 occurring to return the vehicle frame 2 and the vehicle suspension component 3 to their normal spaced relationship to simultaneously extend piston rod 7 moving piston 8 downwardly to expel air from the rod side thereof. The foregoing cycle of operation applies regardless of the magnitude of travel of the frame 2 and wheel suspension component 3. Air is accordingly displaced by each of the constantly moving air cylinders on a vehicle for transfer to tank 24. As the wheels of the vehicle are in constant vertical movement with respect to the vehicle frame an adequate volume of air is pumped to the tank 23.

The riding qualities of the vehicle may be retained by varying suspension components such as spring 13 with the present unit functioning to dampen spring movements.

As shown in FIG. 2 a modified embodiment of the present invention dispenses with the low pressure tank 30 and regulator 31 permitting the air motor 29 to exhaust to the atmosphere. An inlet line at 15' draws atmospheric air through an air filter unit at 34. The remaining components in the modified form of the invention are the same as earlier described and are identified with like prime reference numerals.

While the invention has been described in connection with a gaseous media such as air it will be apparent that utilization of a liquid media is also feasible.

While we have shown but two embodiments of the invention it will be apparent to those skilled in the art that the invention may be embodied still otherwise without departing from the spirit and scope of the invention

Having thus described the invention what we desire to secure under a Letters Patent is:

1. An air compression system for a vehicle deriving a compressive force from relative movement between the spring supported vehicle frame and a wheel suspension member of the vehicle, said system including,
    at least one air cylinder having a piston and piston rod, said cylinder and piston rod oppositely attached to the vehicle frame and the wheel suspension member whereby piston and cylinder travel will occur during relative frame and suspension member movement,
    a transfer conduit communicating the opposite ends of said cylinder,
    a supply conduit in communication with one end of the cylinder,
    an air pressure storage vessel,
    exhaust conduit means extending from the other end of said cylinder to said storage vessel,
    check valves associated with said supply, transfer and exhaust conduits to permit air flow from one end of the cylinder into the opposite end of the cylinder upon reciprocal piston movement during relative movement between said vehicle frame and the wheel suspension member to permit said air cylinder and piston to function in the manner of a pump to charge said storage vessel,
    an air motor operated by a flow of pressurized air from said storage vessel for powering one or more vehicle systems, and
    a second pressure storage vessel to receive the exhaust flow from said air motor, said supply conduit terminating at one of its ends in communication with the last mentioned vessel to provide a flow of pressurized air to said cylinder.

2. The air compression system as claimed in claim 1 wherein the first mentioned pressure storage vessel is of the accumulator type.

3. The air compression system as claimed in claim 1 wherein the first mentioned pressure storage vessel is adapted with valve means to permit periodic charging of the vessel with pressurized air from an external source.

* * * * *